US009449094B2

(12) United States Patent
Varian (10) Patent No.: US 9,449,094 B2
(45) Date of Patent: Sep. 20, 2016

(54) NAVIGATING AMONG CONTENT ITEMS IN A SET

(75) Inventor: Hal R. Varian, Danville, CA (US)

(73) Assignee: Google Inc., Mountain View, CA (US)

( * ) Notice: Subject to any disclaimer, the term of this patent is extended or adjusted under 35 U.S.C. 154(b) by 30 days.

(21) Appl. No.: 13/548,299

(22) Filed: Jul. 13, 2012

(65) Prior Publication Data

US 2014/0019868 A1    Jan. 16, 2014

(51) Int. Cl.
*G06F 3/048* (2013.01)
*G06F 17/30* (2006.01)

(52) U.S. Cl.
CPC ......... *G06F 17/30864* (2013.01); *G06F 3/048* (2013.01); *G06F 17/30873* (2013.01)

(58) Field of Classification Search
CPC .......................... G06F 3/048; G06F 17/30873
USPC ......................................................... 715/738
See application file for complete search history.

(56) References Cited

U.S. PATENT DOCUMENTS

| | | | |
|---|---|---|---|
| 7,644,427 B1 | 1/2010 | Horvitz et al. | |
| 8,751,516 B1* | 6/2014 | Wong et al. | 707/758 |
| 2004/0267600 A1 | 12/2004 | Horvitz | |
| 2006/0059440 A1* | 3/2006 | Pry | 715/838 |
| 2006/0085741 A1* | 4/2006 | Weiner et al. | 715/517 |
| 2008/0082512 A1* | 4/2008 | Hogan | G06F 17/30864 |
| 2008/0091526 A1* | 4/2008 | Shoemaker | 705/14 |
| 2008/0092054 A1* | 4/2008 | Bhumkar et al. | 715/739 |
| 2008/0103884 A1* | 5/2008 | Blinnikka et al. | 705/14 |
| 2008/0215416 A1* | 9/2008 | Ismalon | 705/10 |
| 2008/0306933 A1* | 12/2008 | Valliani et al. | 707/5 |
| 2009/0076886 A1* | 3/2009 | Dulitz et al. | 705/10 |
| 2009/0089415 A1* | 4/2009 | Lecomte et al. | 709/224 |
| 2009/0099919 A1 | 4/2009 | Schultheiss et al. | |
| 2009/0254643 A1* | 10/2009 | Terheggen et al. | 709/223 |
| 2009/0307188 A1* | 12/2009 | Oldham | G06F 3/0482 |
| 2009/0313100 A1* | 12/2009 | Ingleshwar | 705/14.25 |
| 2010/0070529 A1* | 3/2010 | Gokturk | G06Q 30/02 707/780 |
| 2010/0094860 A1* | 4/2010 | Lin et al. | 707/709 |
| 2010/0161605 A1* | 6/2010 | Gabrilovich et al. | 707/736 |
| 2010/0191574 A1* | 7/2010 | Ziemann | 705/10 |

(Continued)

OTHER PUBLICATIONS

Search Results Design: Best Practices and Design Patterns by Louis Lazaris Smashing Magazine Sep. 28, 2009 (Lazaris).*

(Continued)

*Primary Examiner* — William Bashore
*Assistant Examiner* — Nathan Shrewsbury
(74) *Attorney, Agent, or Firm* — Foley & Lardner LLP; John D. Lanza (57) ABSTRACT

Methods, and systems, including computer programs encoded on computer-readable storage mediums, including a method for navigating among content items in a set. The method includes receiving a selection of a content item that is presented in association with a resource page, the content item referencing a results page; determining a plurality of content items that are related to but different from the results page; pre-loading one or more of the plurality of content items; providing the results page in an interface along with one or more controls for enabling a user to navigate among the plurality of content items without having to navigate back to the resource page first; and providing the pre-loaded content items with the results page to enable fast display of the pre-loaded content items upon navigation from the results page to a selected one of the pre-loaded content items using the control.

21 Claims, 6 Drawing Sheets

(56) References Cited

U.S. PATENT DOCUMENTS

| | | | |
|---|---|---|---|
| 2010/0241515 A1* | 9/2010 | Katti | G06Q 30/0276 705/14.72 |
| 2011/0022559 A1* | 1/2011 | Andersen et al. | 706/47 |
| 2011/0035367 A1* | 2/2011 | Gupta et al. | 707/709 |
| 2011/0041174 A1* | 2/2011 | Akiyama et al. | 726/7 |
| 2012/0030013 A1* | 2/2012 | Tsay et al. | 705/14.49 |
| 2012/0036552 A1* | 2/2012 | Dare et al. | 726/1 |
| 2012/0233567 A1* | 9/2012 | Brown et al. | 715/810 |
| 2012/0306894 A1* | 12/2012 | Gottschlich et al. | 345/501 |
| 2013/0086490 A1* | 4/2013 | Roskind | G06F 17/30902 715/760 |
| 2013/0173573 A1* | 7/2013 | Song et al. | 707/706 |
| 2013/0227441 A1* | 8/2013 | Cockcroft et al. | 715/760 |
| 2014/0289214 A1* | 9/2014 | Wong et al. | 707/706 |

OTHER PUBLICATIONS

Google Mobile Blog: Instant Previews now available on mobile [online] [retrieved on Apr. 25, 2012] [retrieved from: http://googlemobile.blogspot.com/2011/03/instant-previews-now-available-on.html] (1 page).

Google Official Blog: Read news fast with Google Fast Flip [online] [retrieved on Jul. 13, 2012] [retrieved from: http://googleblog.blogspot.com/2009/09/read-news-fast-with-google-fast-flip.html#I/2009/09/read-news-fast-with-google-fast-flip.html] (2 pages).

International Search Report and Written Opinion in International Application No. PCT/US2013/046292, mailed Mar. 20, 2014, 12 pages.

International Preliminary Report on Patentability in International Application No. PCT/US2013/046292, mailed Jan. 22, 2015, 9 pages.

* cited by examiner

NAVIGATING AMONG CONTENT ITEMS IN A SET

BACKGROUND

This specification generally relates to information presentation.

The Internet provides access to a wide variety of resources. For example, video and/or audio files, web pages for particular subjects or particular news articles, and other content are accessible over the Internet. Many resources, such as web pages, often include sets or lists of content items (e.g., advertisements, search results, etc.) that are related and that can be selected individually for further access by a user. For example, some web pages include a set or list of content items that are relevant to the content of the web page on which they are presented. User selection of a particular item from the set typically results in the presentation of a resource to the user containing, for example, additional information about the product or service associated with the selected item.

SUMMARY

In general, one aspect of the subject matter described in this specification can be implemented in methods that include receiving a selection of a content item that is presented in association with a resource page, the content item referencing a results page; determining a plurality of content items that are related to but different from the results page; pre-loading one or more of the plurality of content items; providing the results page in an interface along with one or more controls for enabling a user to navigate among the plurality of content items without having to navigate back to the resource page first; and providing the pre-loaded content items with the results page to enable fast display of the pre-loaded content items upon navigation from the results page to a selected one of the pre-loaded content items using the control. Other embodiments of this aspect include corresponding systems, apparatus, and computer programs, configured to perform the actions of the methods, encoded on computer storage devices.

These and other embodiments can each optionally include one or more of the following features. The content item can be an advertisement. The resource page can include search results and the content items can be the search results. The content items can be selected from other content items presented on the resource page. The content items can be selected from an auction associated with an original decision to present the content item on the resource page. The content items can be determined to be of potential interest to the user by other means. For example, in the context of images the content items may be images that are visually similar to the selected image.

The method can also include selecting at least a portion of the content items based at least in part on one or more characteristics associated with the selected content item. The method can also include providing the selection in a user interface that occupies substantially an entire portion of a screen area associated with a rendering device and, in addition or alternatively, providing the selection and at least one other of the content items for concurrent presentation in the user interface.

The control can enable navigation to other ones of the content items directly without having to navigate back to the resource page. The method can include receiving instructions via the one or more controls to navigate to one of the content items, and providing immediate access to the one. Pre-loading the content items can include creating images associated with the content items. Providing immediate access to the one can include loading the image associated with the one after receipt of direction to navigate to the one via the control.

The method can also include determining when an impression of the one of the pre-loaded content items exceeds a dwell time threshold and charging a content sponsor for the impression when the dwell time threshold is exceeded.

Particular implementations of the subject matter described in this specification can be implemented to realize none, one or more of the following advantages. A user interface can be provided with controls that enable the user to navigate among content items in a set of content items (or web pages associated with the respective content items) presented on a resource page without having to return to the resource page to access the other content items in the set. Being able to navigate among the content items without having to return to the resource page reduces the communication bandwidth requirements of and processing burdens on the user device being used to present the content items and the system providing access to the content items.

Further, as the set of content items can be pre-fetched and/or pre-loaded, the latency and delays associated with iteratively navigating between the respective landing pages and resource page and/or waiting for a landing page to load on the user device can be reduced by using the user interface to navigate amongst the content items (or their respective landing pages) in the set. This also enhances the user's experience as the user is not subject to the above-described loading and iterative navigation vexations.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various figures indicate like elements.

DETAILED DESCRIPTION

This description generally relates to facilitating user navigation among content items (or web pages or other resources associated with those content items) from a set or list of content items without returning to the resource page that initially presented the set or list of content items. More particularly, a user interface is provided with controls that enable a user to navigate among content items (or web pages or other resources associated with or related to the content items) in a set of content items presented on a resource page without having to return to the resource page to access the other content items in the set. For example, in the context of a set of content items (e.g., advertisements) presented to a user on a publisher's web page (e.g., the resource page), upon user selection of a first content item from the set, a user interface is provided on the user's user device that includes the selection and one or more controls for navigating to other items in the set.

The user can use the user interface controls to navigate to or among the elements in the set (e.g., the various landing pages) without first having to return to the publisher's web page. Thus the user interface controls allow the user to navigate from the landing page for the first content item directly to, for example, the landing page for a second content item in the set without requiring the user to first return to the publisher's web page and select the second content item from the publisher's web page. In a similar manner, the user interface controls allow the user to navigate directly from the landing page of the second content item to landing pages for other content items in the set (e.g., to a landing page for a third content item or back to the landing page for the first content item) without having to return to the publisher's web page to access and then select another content item from the set. Thus the user interface controls allow the user to access other content items in the set without iteratively navigating back and forth between the respective landing pages and the resource page.

For some user devices (e.g., smart phones and tablets) with limited display screen space not all of the content items in a list or set can be displayed at once. For such user devices, a user can employ the user interface controls to navigate among or access the content items in the set (or results pages associated with the content items) without having to return to the resource page and/or scroll across the resource page to access the other content items in the set including those that are not initially displayed on the user device given its limited screen size (e.g., the content items that are "below the fold"). As described below, the user interface controls can be used to navigate among content items in many different types of lists or sets, for example, advertisements in a set of advertisements, search results in a set of search results (e.g., product search results, flight search results, book search results, etc.) and images in a set of images, to name just a few.

Figure 1:
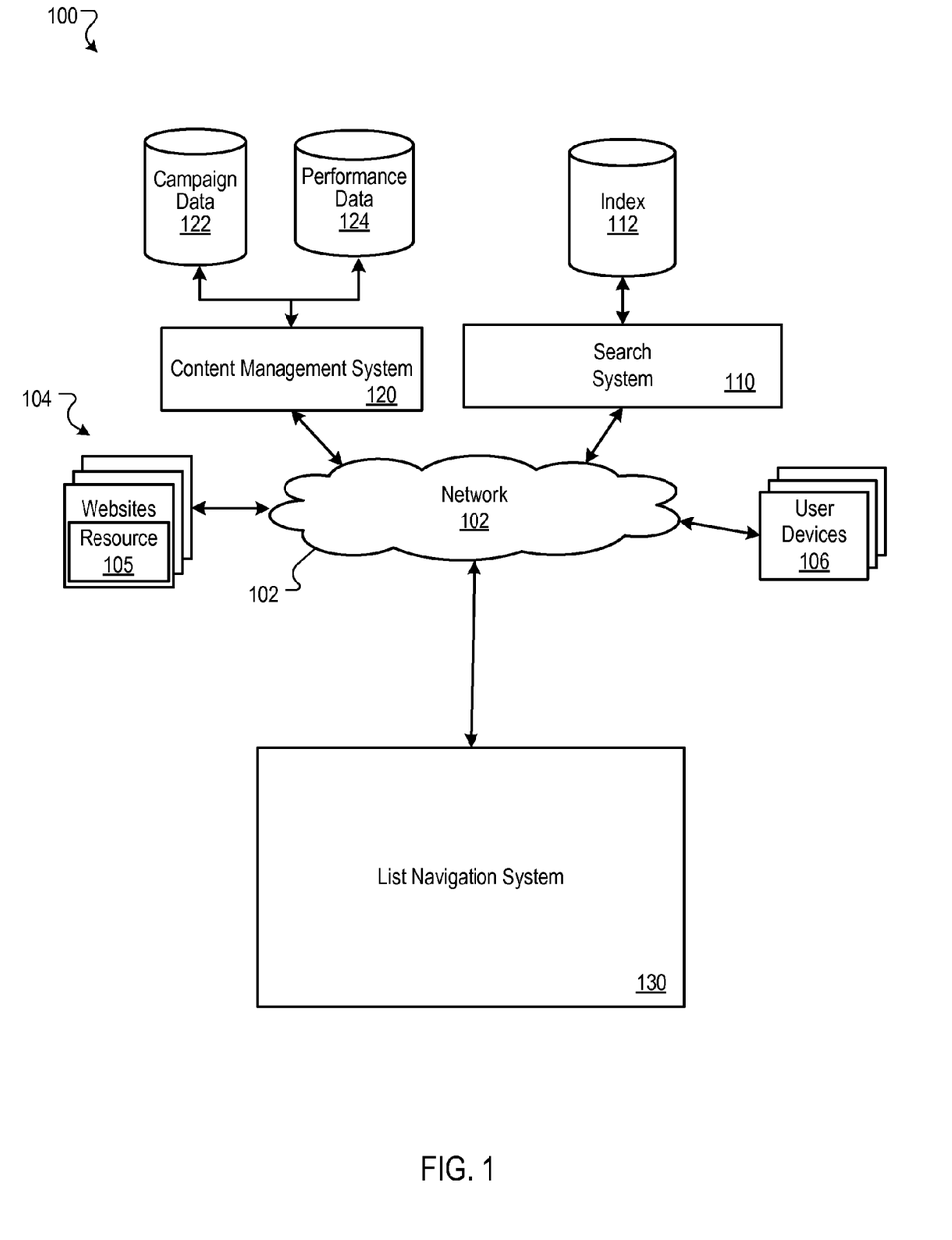
FIG. 1 is a block diagram of an example list navigation system.

FIG. 1 is a block diagram of an example list navigation system 130. The list navigation system 130 can, for example, cause a user interface with controls to be provided (e.g., to a user device) to enable navigation among content items in a set without returning to the source of the set. A computer network 102, such as a local area network (LAN), wide area network (WAN), the Internet, or a combination thereof, connects web sites 104, user devices 106, a search system 110, a content management system 120 and the list navigation system 130. The environment 100 may include many thousands of web sites 104 and user devices 106.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 is maintained by/associated with a content publisher, which is an entity that controls, manages and/or owns the content presented on the website 104.

A resource 105 is any data that can be provided by the publisher/server over the network 102 and that is associated with a resource address. Resources 105 include HTML pages, word processing documents, and portable document format (PDF) documents, images, video and feed sources. The resources 105 can include content, such as words, phrases, pictures, and so on, and may include embedded information (such as meta information and hyperlinks) and/or embedded instructions (such as scripts).

A user device 106 is an electronic device that is under the control of a user and is capable of requesting and/or receiving resources over the network 102. Example user devices 106 include personal computers, mobile communication devices such as phones and tablets, and other devices that can send and/or receive data over the network 102. A user device 106 typically includes a user application, such as a web browser, to facilitate the sending and receiving of data over the network 102. The web browser can enable a user to display and interact with text, images, videos, music and other information typically located on a web page on the world wide web or a local area network.

To facilitate searching of these resources 105, a search system 110 can be included in the network 102. The search system 110 can identify resources 105 by, for example, crawling the web sites 104 and indexing the resources 105 available from the web sites 104. The indexed and, optionally, cached copies of the resources 105, can be stored in an index 112.

The user devices 106 can submit search queries to the search system 110. The search queries can be submitted in the form of a search request that includes the search query and, optionally, a unique identifier that identifies the user device 106 that submitted the request. The unique identifier can be data from a cookie stored at the user device 106, or a user account identifier if a user causing the submission of the search query maintains an account with the search system 110, or some other identifier that identifies the user device 106 or the user using the user device 106.

In response to the search request, the search system 110 can, for example, use the index 112 to identify resources 105 that are relevant to the search query. The search system 110 identifies the resources 105 in the form of search results and returns the search results to the user devices 106 in the search results page. A search result is data generated by the search system 110 that identifies a resource 105 that satisfies a particular search query, and includes a resource locator for the resource 105. An example search result can include a web page title, a snippet of text extracted from the web page, and the URL of the web page.

The search results can be ranked based on scores related to the resources 105 identified by the search results, such as information retrieval ("IR") scores, and optionally a separate ranking of each resource 105 relative to other resources. The search results can be ordered according to these scores and provided to the user device 106 according to the order in a set.

The user device 106 receives the search results page(s) and renders the page(s) for presentation to a user. In response to a user selecting a search result at a user device 106, the user device 106 requests the resource 105 identified by the resource locator included in the selected search result. The server hosting the web site 104 from which the resource 105 is available receives the request for the resource 105 from the user device 106 and provides the resource 105 to the requesting user device 106. The resource information can be presented in a user interface that enables navigation to other resources in an initially presented set of resources directly without returning to the source web site as will be described in further detail below.

The content management system 120 facilitates the provisioning of content items with the resources 105. In particular, the content management system 120 allows content sponsors (e.g., advertisers) to define rules that take into account, for example, attributes of particular users to provide content to the users. Example rules include keyword rules, in which a content sponsor provides bids for keywords that are present, for example, in either search queries or webpage content. Content items that are associated with keywords (e.g., having bids that result in a slot being awarded in response to an auction) can be selected for presentation to a user in accordance with these rules.

Content items can be provided for many different resources, such as the resources 105 of the web sites 104, on a search results page resource. For example, a resource 105 from a web site 104 can include instructions that cause the user device 106 to request one or more content items from the content management system 120. The request includes a publisher identifier and, optionally, keyword identifiers related to the content of the resource 105. The content management system 120, in turn, provides relevant content items to the particular user device 106.

The content management system 120 includes a data storage system that stores campaign data 122 and performance data 124. The campaign data 122 stores content items (e.g., creatives), rules, and budgeting information for content sponsors. The performance data 124 stores data indicating the performance of the content items that are served. Such performance data can include, for example, click through rates for content items, the number of impressions and the number of conversions for respective content items. Other performance metrics can also be stored.

The campaign data 122 and the performance data 124 can be used as input parameters to an auction or another selection process. In some implementations, the content management system 120, in response to each request, conducts an auction to select content items that are provided in response to the request. The content items are ranked according to a score that, in some implementations, is proportional to a value based on a bid and one or more parameters specified in the performance data 124. Typically, the highest ranked content items resulting from the auction can be selected and provided to the requesting user device 106.

In some implementations, the list navigation system 130 can provide user interface controls to a user device 106 to enable a user of the user device 106, through use of the user interface controls, to navigate among content items in a set of content items presented on a resource page without having to return to the resource page to access the other content items in the set. For example, the set of content items can be advertisements presented on a search results page and, upon selection of an advertisement from the set, the user interface controls are presented along with the landing page associated with that advertisement. The user interface controls can then be used to directly navigate to landing pages for other advertisements in the set without having to first return to the search results page.

Figure 2A:
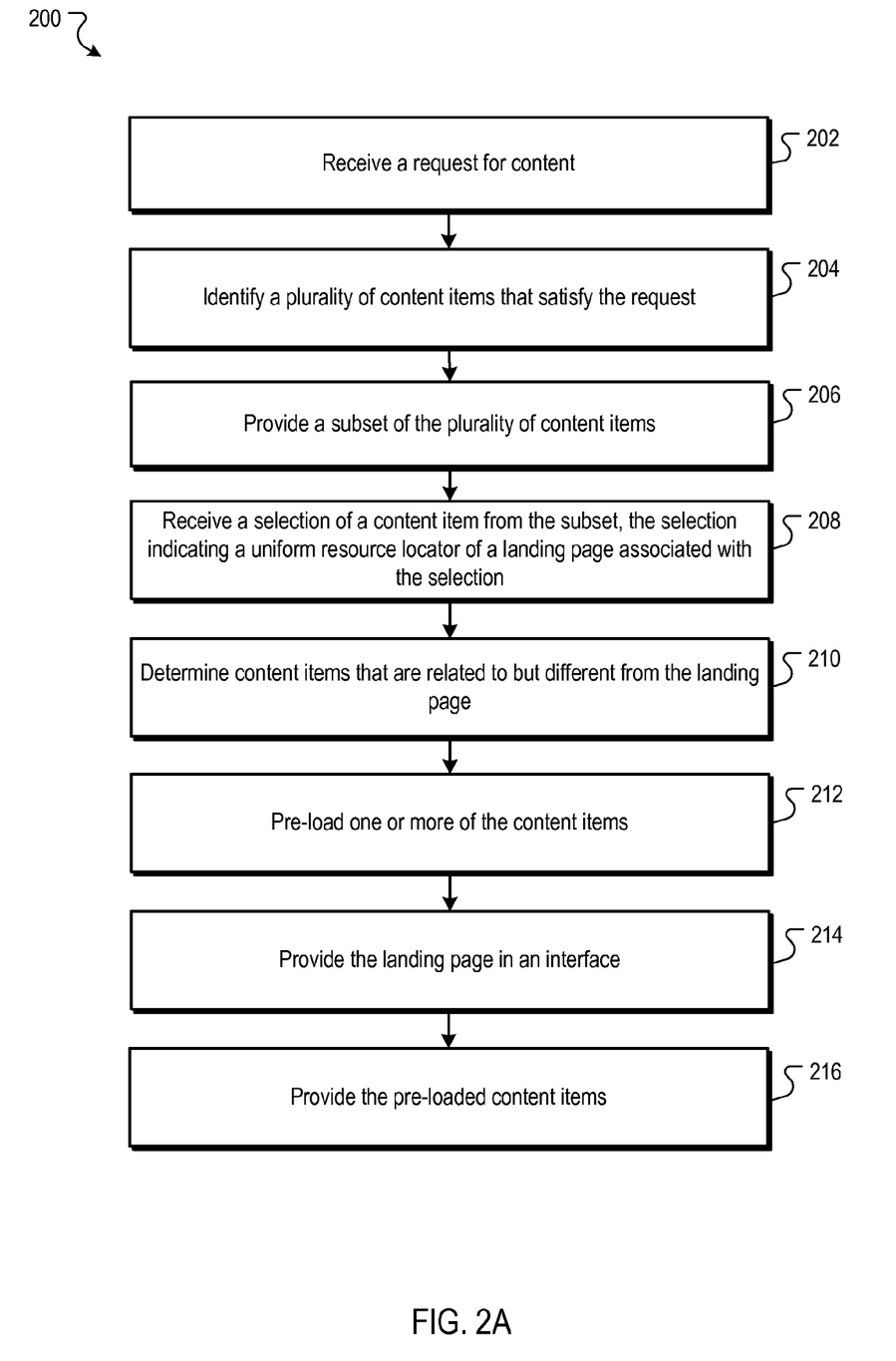
FIG. 2A is a flow diagram of an example process for navigating among content items in a set.
Figure 2B:
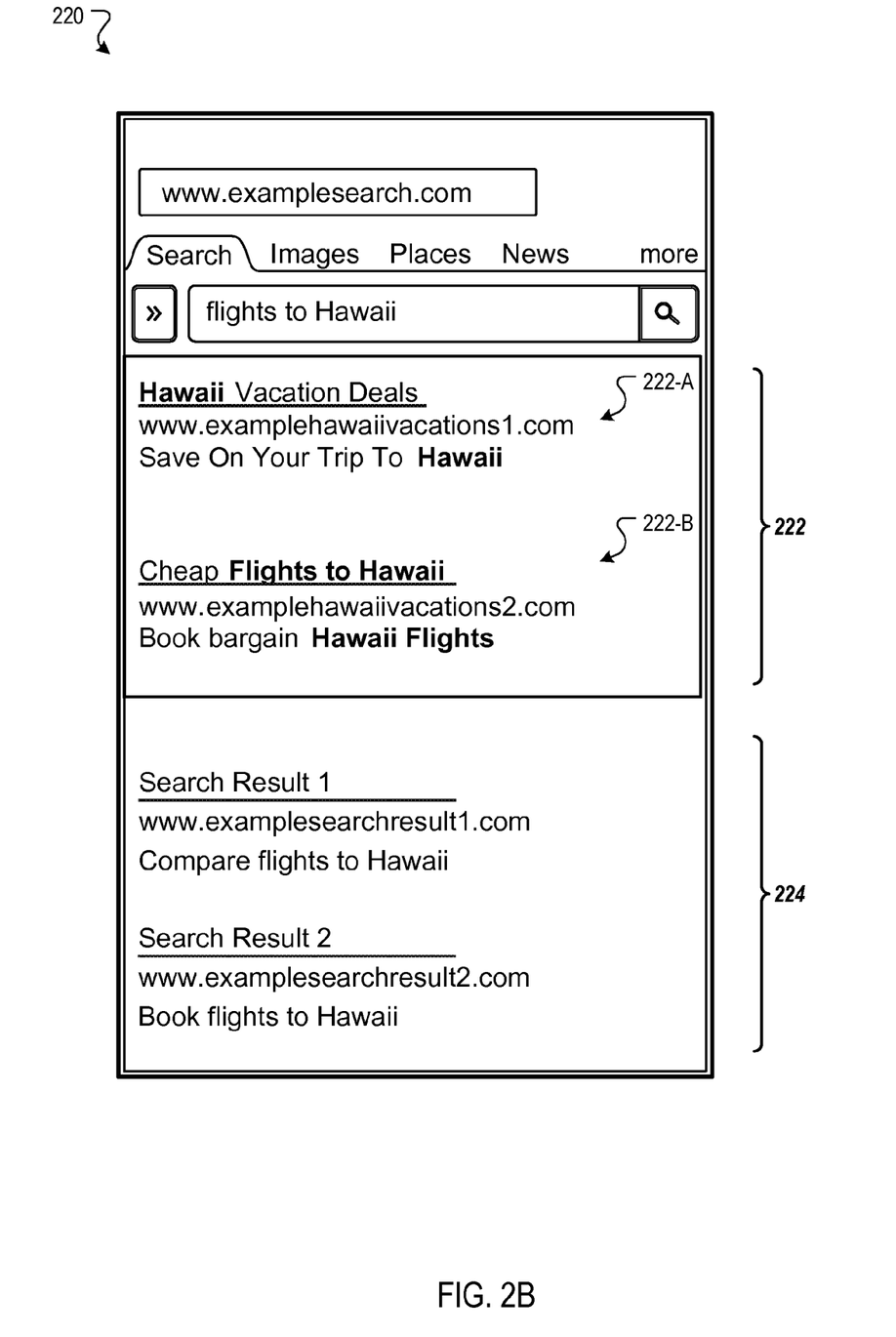
FIGS. 2B-2D show example screenshots of an initial resource and web pages with a user interface for navigating among content items.
Figure 2C:
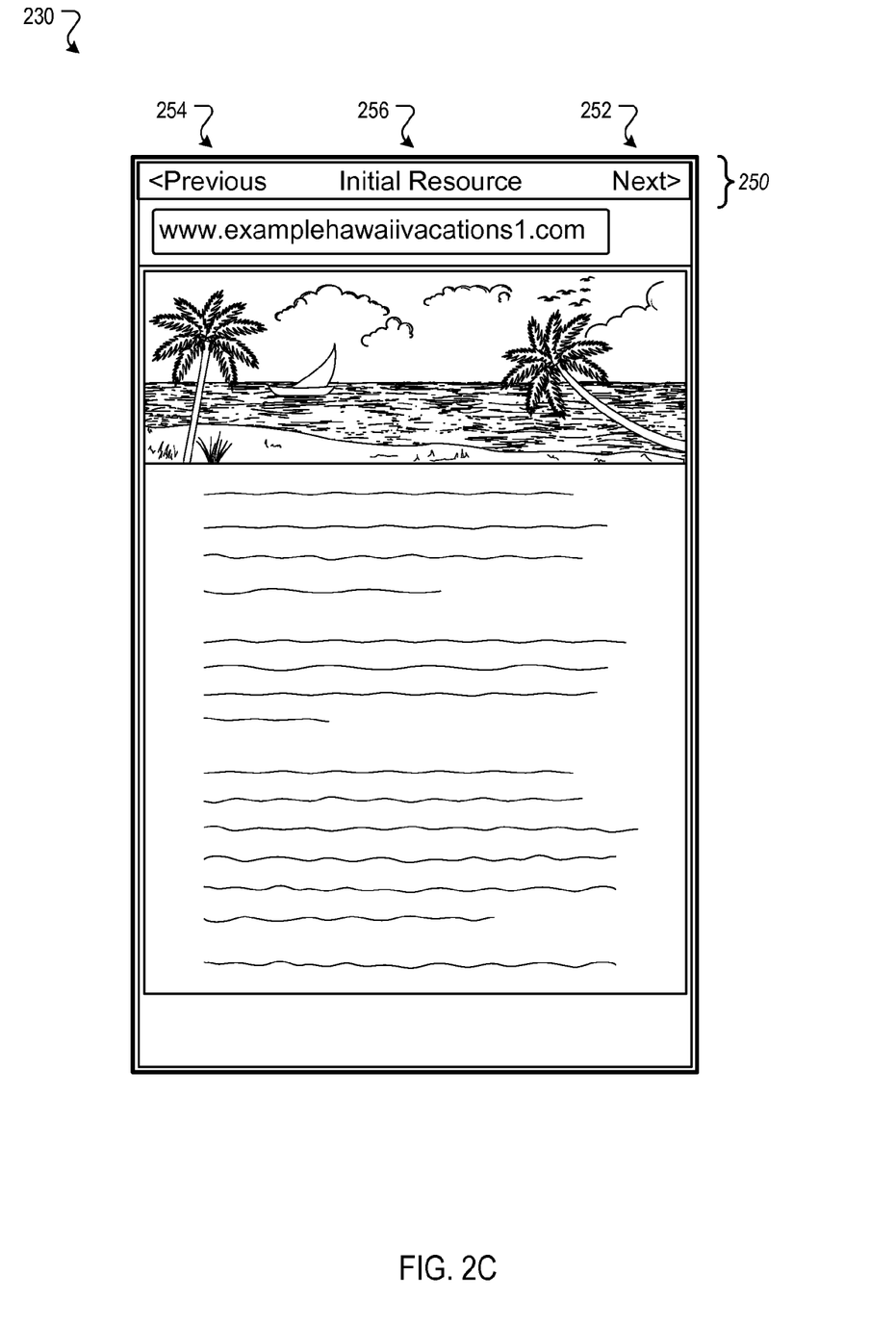
Figure 2D:
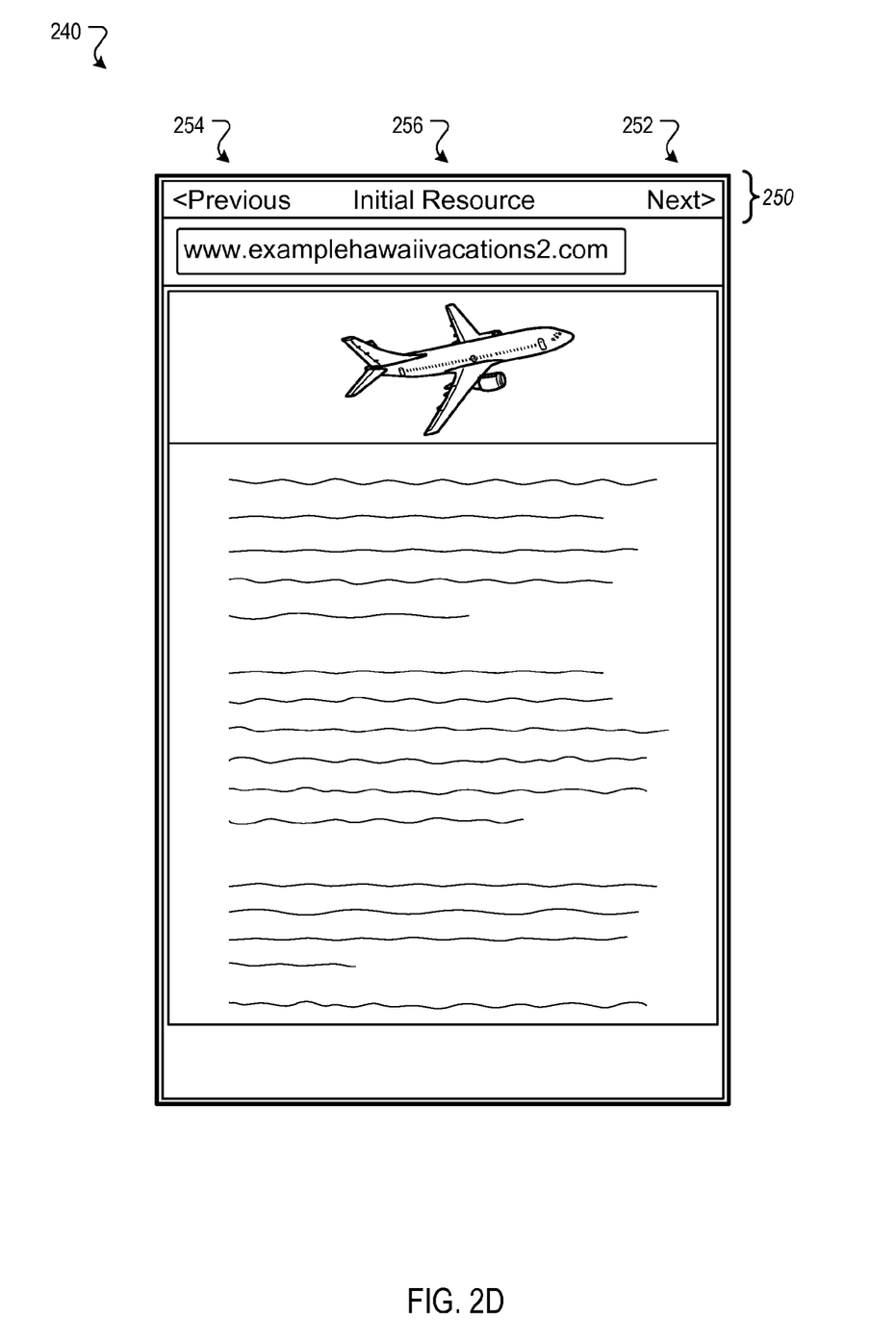

The operation of the list navigation system 130 is described below with reference to FIGS. 2A-D. FIG. 2A shows a flow diagram of an example process for providing a user interface with controls for navigating among content items in a set. FIGS. 2B-D show example screenshots of an initial resource and web pages with a user interface for navigating among content items in the set.

Referring to FIG. 2A, a request for content is received from a user device (202). The request, for example, can be a request, from a mobile user device 106 received by the content management system 120, for advertisements to display in a web page being accessed by the mobile user device 106. By way of another example, the request can be a request received by the search system 110 for search results caused by a user submitting a search query through a mobile user device 106. In some implementations, the list navigation system 130 is in data communication with the content management system 120 and the search system 110 or is part of (e.g., integral to) the content management system 120 and/or the search system 110. In some implementations, the list navigation system 130 receives or can otherwise access the request. Other types of requests can also be received (e.g., request for images). For convenience, in the below description, the list navigation system 130, the content management system 120 and the search system 110 are described as an integrated system. However, such a configuration is not required and in some implementations the list navigation system 130 is separate from and distinct to the content management system 120 and/or the search system 110.

A plurality of content items that satisfy the request is identified (204). In some implementations, the content management system 120 identifies content items that satisfy the request. For example, if the request is from a user device 106 requesting advertisements for placement on a search results web page being rendered by the user device 106, the content management system 120 can use the keywords and other relevant data included or associated with the request and related to the search query ("search keywords") to identify advertisements responsive to the search keywords to satisfy the request. An advertisement responsive to the search keywords is, for example, an advertisement that has an advertisement keyword (e.g., a keyword designated by a content sponsor of the advertisement) that matches or is otherwise related (e.g., semantically related) to terms associated with a received request.

By way of another example, if the request is from a user device 106 requesting a search results page with search results for a submitted search query, the list search system 110 can use the index 112 to identify web pages that are relevant to the search query and return search results that reference the identified web pages to the user devices 106 in a search results page.

A subset of the plurality of content items is provided for display in association with a presentation of a resource ("initial resource") on a user device in response to the received request (206). In some implementations, one of the content management system 120 or the search system 110 can provide a subset of the identified content items (e.g., from process 204) to the user device 106 submitting the content request. For example, as described above the request can be a search results request and the initial resource can be a search results page including the most relevant search results (e.g., the subset of content items) that satisfy the request as determined by, for example, the respective IR scores for the search results. The subset of the content items can be the set of search results, from all identified search results, with the highest IR scores or other indicators of relevance. For example, fifty search results can be identified (e.g., from process 204) and the subset of search results provided to the requesting user device 106 can be the ten most relevant search results from the set of fifty. By way of another example, the request can be a request for advertisements and the initial resource 105 can be a web page on which the two highest ranked advertisements that satisfy the request (e.g., the subset of content items) are provided for presentation.

An exemplary initial resource 220 presented on a user device 106 (e.g., mobile user device) with a subset of content items 222 is shown in FIG. 2B. The initial resource 220 is a search results page 220 for the search query "flights to Hawaii" and includes two advertisements 222 (e.g., the subset of content items) provided in response to the received request (e.g., from process 202). The first of the two advertisements 222 is an advertisement 222-A for "Hawaii Vacation Deals" and has a landing page of www.examplehawaiivacations1.com. The other advertisement is an advertisement 222-B for "Cheap Flights to Hawaii" and has a landing page of www.examplehawaiivacations2.com. The search results page 220 also includes search results 224 responsive to the submitted search query ("flights to Hawaii").

After presentation of the subset of content items on the user device, a selection of a content item from the subset is received (208). The selection can indicate a uniform resource locator of a landing page associated with the selected content item from the subset. In some implementations, the list navigation system 130 receives the selection. For example, in the case of the subset of content items being a set of advertisements presented with a web page (e.g., the initial resource), a user can use the user device 106 to cause a particular advertisement from the set to be selected. In turn, the user device 106 can provide an indication of the selected advertisement to the list navigation server 130. In this example, the uniform resource locator of a landing page associated with the selected content item can be the landing page for the advertisement's advertiser or a landing page for the product or service promoted in the advertisement.

By way of another example, in the case of the subset of content items being a set of search results presented with a search results page (e.g., the initial resource), a user can use the user device 106 to cause a particular search result from the set to be selected. In turn, the user device 106 can provide an indication of the selected search result to the list navigation server 130. In this example, the uniform resource locator of a landing page associated with the selected content item can be the landing page of the resource 105 referenced by the selected search result (e.g., one of the resources 105 identified as being relevant to the submitted search query from process 206).

Content items that are related to but different from the selected item (e.g., landing page) are determined (210). In some implementations, the list navigation system 130 determines content items (e.g., advertisements, search results, landing pages for the advertisements or search results) that are related to but different from the selected content item or the landing page associated with the selected content item ("related content items") in response to receiving the selection. For example, the list navigation system 130 can determine the other content items from the subset (e.g., the content items from the subset that were not selected in process 208) to be the related content items. In this example, if the content items in the subset are advertisements, the list navigation system 130 can determine one or more of the landing pages for the non-selected advertisements in the subset to be the related content items. Thus if the subset includes Advertisements A-H and Advertisement A is selected (e.g., in process 208) then one or more of the landing pages for Advertisements B-H can be determined to be the related content items.

Continuing with this example, if the content items in the subset are search results, the list navigation system 130 can determine one or more of the landing pages/web pages referenced by the non-selected search results in the subset to be the related content items. Thus if the subset includes Search Results A-H referencing Web Pages A-H, respectively, and Search Result H is selected (e.g., in process 208) then one or more of the Web Pages A-G for Search Results A-G can be determined to be the related content items.

In some implementations, the related content items can include content items in addition or alternative (e.g., different from) to the non-selected content items in the subset or landing pages thereof. For example, the related content items can be content items that are in a similar vertical/subject matter category to that of the selected content item or otherwise related to the selected content item (e.g., semantically related), content items that are determined to be relevant to the user (e.g., based on comparisons of the subject matter of the content items with data from the user's user profile such as interests or demographic information), content items that are relevant to the subject matter of web pages viewed and advertisements selected by the user (e.g., from the user's online browsing patterns), or combinations thereof. In some implementations, users are provided the opportunity to opt/in or out of such information collection and use.

One or more of the content items can be pre-loaded (212). In some implementations, the landing pages for the content items in the subset are pre-loaded or pre-fetched (e.g., the landing pages, or content items more generally, are requested and received prior to a request or instruction to present the landing pages/content items) by the list navigation system 130. For example, during or proximate in time to the selection and provision of the subset (e.g., by process 206), the list navigation system 130 can access (e.g., from a cached data store) or request from the relevant publishers/servers the landing pages for all or some of the content items in the subset (and can repeat this process when new content items are added to the subset). In turn, as described below, the list navigation system 130 can provide the pre-fetched landing pages to the user device 106 with the landing page for the selected content item for local storage at the user device 106. In this way, upon navigation among the content items in the subset using the interface 250, the various landing pages can be presented by the user device 106 with reduced latency (e.g., as compared with the user device 106 requesting and receiving, on a page-by-page basis, the next landing page to be presented in response to the user's interaction with the controls 252 and 254).

In some implementations, the list navigation system 130 fetches (e.g., requests and receives) the relevant landing pages for all or a predetermined number (e.g., plural) of the content items in the subset and stores them in a data store (e.g., in response to identifying the content items in the subset at process 206 or prior to providing the interface 250 to the user device 106). As described below, upon receiving instructions via the interface 250 that the user has interacted with the controls 252 and 254 to request that another landing page be presented, the list navigation system 130 can access the relevant landing page from the data store (without having to first request it from the corresponding publisher/server as it was previously fetched) and immediately provide it to the user device 106 (e.g., as compared with providing all of the relevant landing pages for storage at the user device 106). The list navigation system 130 can repeat this process as new or different content items are added to the subset and requested for presentation to the user. In some implementations, only one item is pre-fetched, specifically a next item in the list or subset.

The landing page (of the selected content item from process 208 or other resource 105 associated with the selected content item) can be provided in an interface along with one or more controls for enabling a user to navigate among the content items without having to navigate back to the resource first (214). In some implementations, the landing page for the selected content item (e.g., advertisement, search result) is provided to the requesting user device 106 with an interface that includes controls that allow a user to navigate among the related content items (e.g., the preloaded content items) and the selected content item (e.g., the landing page for the selected content item) without having to go back to the initial resource to access them. The landing page can, for example, be provided to the user device 106 by the list navigation system 130 sending instructions to the user device 106 instructing the user device to request the landing page from the publisher/server hosting the landing page. By way of another example, the list navigation system 130 can provide the landing page to the user device 106 by requesting the landing page from the relevant publisher/server (or accessing it from a cached data store) and then sending the landing page to the user device 106 embedded along with the controls in an interface that is presented to the user.

In some implementations, the landing page of the selected content item is provided in the interface such that the landing page and the interface occupy all or substantially all of the display screen area of a user device 106, or the landing page is the only landing page presented (e.g., only one landing page is presented at a time and no portions of other landing pages are presented). For example, occupying substantially all of the display screen area can mean occupying a portion of the display screen area that precludes a presentation of another landing page in a manner that the content or subject matter of the another landing page is readily discernable. In some implementations, multiple landing pages (or portions of multiple landing pages) can be concurrently presented with the interface. Example landing pages with such an interface are shown in FIGS. 2C and 2D.

Referring to FIG. 2C, the landing page 230 is presented with or in the interface 250 on a user device 106. The landing page 230 is a landing page for the advertisement 222-A. The landing page 230 is presented along with the interface 250, for example, in response to a user selection of the advertisement 222-A from the search results page 220.

The interface 250 can include controls 252-256 to facilitate navigation to or among the related content items (e.g., and the selected content item or its landing page). In some implementations, the interface 250 can be implemented by a plug-in or other application installed in or used in conjunction with the browser application of the displaying user device 106. In some implementations, the list navigation system 130 provides or causes the provision of instructions (e.g., a script) for generating the interface 250 (e.g., in the user device's browser application) and implementing the functions and features of the interface 250. For example, instructions in the HTML of the landing page can cause the displaying user device 106 to implement the interface 250. Alternatively, instructions can be included as part of the browser, part of another application or a service that is used to retrieve the selected content item.

In some implementations, the content items in the subset can be ordered. For example, the content items can be ordered in relation to their ranking (e.g., the search results or advertisements in the subset can be ranked as described above). The interface 250 can include controls 252, 254 and 256 that cause the displaying user device 106 to present, with respect to the currently displayed landing page, the landing page for the next ordered related content item in the subset, the landing page for the previous ordered related content item in the subset, and the page associated with the initial resource, respectively. Thus by interacting with the controls 252-256, the user can navigate to or cause to be displayed the landing pages for other related content items in the subset without have to first go back to the initial resource and select the desired related content item. For example, the user can interact with or select the control 252 to cause the user device 106 to replace the landing page 230 for advertisement 222-A with the landing page 240 for advertisement 222-B as described below (e.g., as it is the landing page for the next ordered advertisement in the subset from search results page 220/initial resource).

In response to the selection of the control 252, the user device 106 presents the landing page 240 for advertisement 222-B. As with the landing page 230, the interface 250 can also be presented with the landing page 240 and any other landing pages for advertisements/content items in the subset. From the landing page 240, the user can interact with or select the control 254 and cause the user device 106 to present the landing page 230 again (e.g., and therefore not display the landing page 240). If there were additional advertisements in the subset (e.g., other advertisements from the auction that selected advertisements 222-A and 222-B), the user could interact with or select the controls 252 and 254 to cause the user device 106 to present the landing pages for the other advertisements in the subset in a similar manner to that described above. In this way the user can navigate among the content items in the subset without having to first return to the initial resource (e.g., search results page 220).

As described above, in some implementations, the content items (e.g., determined by the process 210) can be pre-loaded. The pre-loaded content items can be provided to the user device with the landing page to enable fast display of the pre-loaded content items upon navigation from the landing page to a selected one of the pre-loaded content items using the one or more controls (216). In some implementations, the list navigation system 130 can provide instructions to the user device 106 (e.g., with the interface 250 or with the provision of the subset of content items) to cause the user device 106 to pre-fetch the landing pages for all or plural of the related content items in the subset (e.g., as opposed to the list navigation system 130 providing such landing pages). Regardless of whether the pre-fetched landing pages are stored at or requested by the list navigation system 130 or the user device 130, such pre-fetching enables fast and/or immediate display of the landing pages for the content items in the subset upon navigation using, for example, the controls 252 and 254 in the interface 250.

The list navigation system 130, in some implementations, can create or retrieve images (or other representations) of the content items or landing pages for the content items in the subset (e.g., through image generation/compression algorithms and tools). Such images can typically be provided to and/or be loaded for presentation by a user device 106 more quickly than the corresponding landing page data files. As such, navigation, via the interface 250, and presentation of the images can be performed with less latency and/or processing delays than navigation and presentation of the corresponding landing pages themselves. In some implementations, the list navigation system 130 creates and provides a relevant image of a landing page to a user device 106, for example, in a request time process in response to the user interacting with the interface 250 to navigate to/request the presentation of another item in the subset (e.g., in the related content items).

As described above, in some implementations, the interface 250 includes the control 256. In response to the user interaction with/selection of the control 256, the user device 106 returns to/presents the initial resource regardless of which landing page/content item is currently being presented. For example, if the landing page 240 is currently being presented by the user device 106, interaction/selection of the control 256 can cause the user device 106 to display the search results page 220. In contrast, in this example, selecting the "back" button in a browser application will cause the user device 106 to present the landing page 230 (as it was the previously presented page) and not the search results page 220. To view the search results page 220 (e.g., the initial resource), the back button would have to be selected again to cause the user device 106 to go "back" from the landing page 230 to present the search results page 220. If the currently displayed landing page is many selections away from the presentation of the initial resource then the control 256 can be selected once to cause the initial resource to be presented whereas the back button would have to be selected many times over to cause the initial resource to be presented.

In some implementations, the interface 250 can include a position status element (not shown) with position indictors that correspond to each of the content items in the subset or some contiguous group of content items in the subset. The position indicator corresponding to the content item having the currently presented landing page can be pronounced (e.g., highlighted) to indicate the relative position of the content item in the ordered set of content items.

The position indicators can also, for example, be user selectable. Selection of a particular position indicator can cause the user device 106 to display the landing page of the content item corresponding to the selected position indicator. For example, if there are eight ordered content items in the subset, the position status element can have eight position indicators, one for each content item. The first ordered content item (e.g., the selected content item) can correspond to the first position indicator (e.g., the leftmost or top position indicator) and the last ordered content item can correspond to the eighth position indicator (e.g., the rightmost or bottom position indicator). If, for example, the currently presented landing page is for the third ordered content item, then the third position indicator from the left can be highlighted to indicate the landing page for the third ordered content item is currently being presented. If the user desires to cause the landing page for the eighth ordered content to be presented, then the user can select the eighth position indicator. In this way the user can cause the presentation of a desired landing page without sequentially stepping through the ordered set of content items.

In some implementations, the interface 250 can include other controls. For example, the interface 250 can include controls that sort and/or re-order the content items in the subset based on one or more criteria. Such criteria can include, for example, controls that sort the content items in the subset by price (e.g., sort by the prices for televisions listed in advertisements), by destination (e.g., sort by the destination airline flights in search results for discounted tickets), by manufacturer (e.g., sort by the manufacturer of mobile phones search results for mobile phones), by author (e.g., sort by the author of books in search results for books in a particular genre) to name just a few.

The user can, for example, interact with the controls 252-256 by interacting with the relevant control to cause it to perform its function ("activate" the control) (e.g., by "touching" using a touch control, by voice commands to activate the control, by activating the control through a keystroke, a mouse movement, finger movements across the user device's screen, or by changing the relative spatial position or orientation of the user device or other gestures (e.g., "shaking" the user device 106), or some combination thereof).

In some implementations, after each presentation of a landing page for a content item in the subset, the list navigation system 130 can change the content items in the subset (e.g., replace, remove, add new content items, or some combination thereof) and/or re-order the content items. For example, the list navigation system 130 can change and re-order the content items in the subset based at least in part on the length of time that the user dwelled on (or otherwise interacted with) the currently presented landing page (e.g., as the dwell time may be an indicator of interest or disinterest in the subject matter of the landing page).

In some implementations, when the user dwells on a particular landing page for an extended period of time (e.g., greater than a threshold dwell time or greater than the user's average dwell time) then the list navigation system 130 can identify other content items having subject matter related or similar to that of the content item with the currently presented landing page (or otherwise related such as content items from content sponsors in similar industries or with similar customers or audiences). The list navigation system 130 can, for example, add these newly identified content items to the subset and/or remove content items in the subset that are determined not to be similar to the content item with the currently presented landing page (e.g., not within some similarity measure threshold). For example, if there are three content items in the subset and the list navigation system 130 identifies twelve new content items that are similar to the content item with the currently presented landing page and determines the existing content items in the subset are still relevant, then the list navigation system 130 can add the twelve new content items to the subset to create a subset of fifteen content items. The list navigation system 130 can then, for example, rank and order/re-order the fifteen content items as described above. All fifteen content items (or landing pages thereof) can then be navigated to by use of the interface 250.

In some implementations, if the currently displayed landing page is the landing page for the first or last ordered content item in the subset then the appropriate control can be disabled or adjusted (e.g., grayed out) to indicate that the currently displayed landing page is the landing page for the content item in the first or last ordered position in the subset.

In some implementations, the interface 250 remains presented during the entirety of the user browsing session to enable the user to interact with the control 256 to return or "jump" directly back to the initial resource regardless of what web page the user's user device 106 is currently presenting (e.g., a web page other than a landing page for one of the content items in the subset). In some implementations, the interface 250 (or controls 252-256) is presented upon user activation, such as after mousing over a designated area or otherwise indicating a need/desire to present the interface 250 (or controls 252-256).

In the context of navigation among the landing pages/content items through use of the interface 250, impressions can be determined in numerous ways. An impression can occur, for example, when a landing page for a content item (e.g., advertisement) in the subset is displayed by a user device 106 if certain criteria are met. For example, the criteria can be that a user navigated to the landing page and the user device 106 presented the landing page. Other criteria can also be used such as dwell time on the landing page. For example, an impression can be determined to occur (e.g., by the list navigation system 130) for a particular content item in the subset if the landing page for that content item is displayed (e.g., through or with the interface 250) for a minimum dwell time threshold (e.g., ten seconds). In response to an impression occurring, the list navigation system 130 can charge a content sponsor of the content item for the impression (e.g., $0.40). In some implementations, the list navigation system 130 can additionally or alternatively charge a content sponsor if a user interacts with the content sponsor's content item/landing page (e.g., clicks on a link on the landing page or makes a purchase from the landing page, etc.).

In some implementations, the processes described herein (e.g., process 200) can be implemented by one or more processors that enable the presentation of the interface 250 on a user device 106. For example, the features and functionality of the list navigation server 130 can be realized in the interface 250 (e.g., or another application on the user device 106) or alternatively be delivered as a service to the user device 106.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 3:
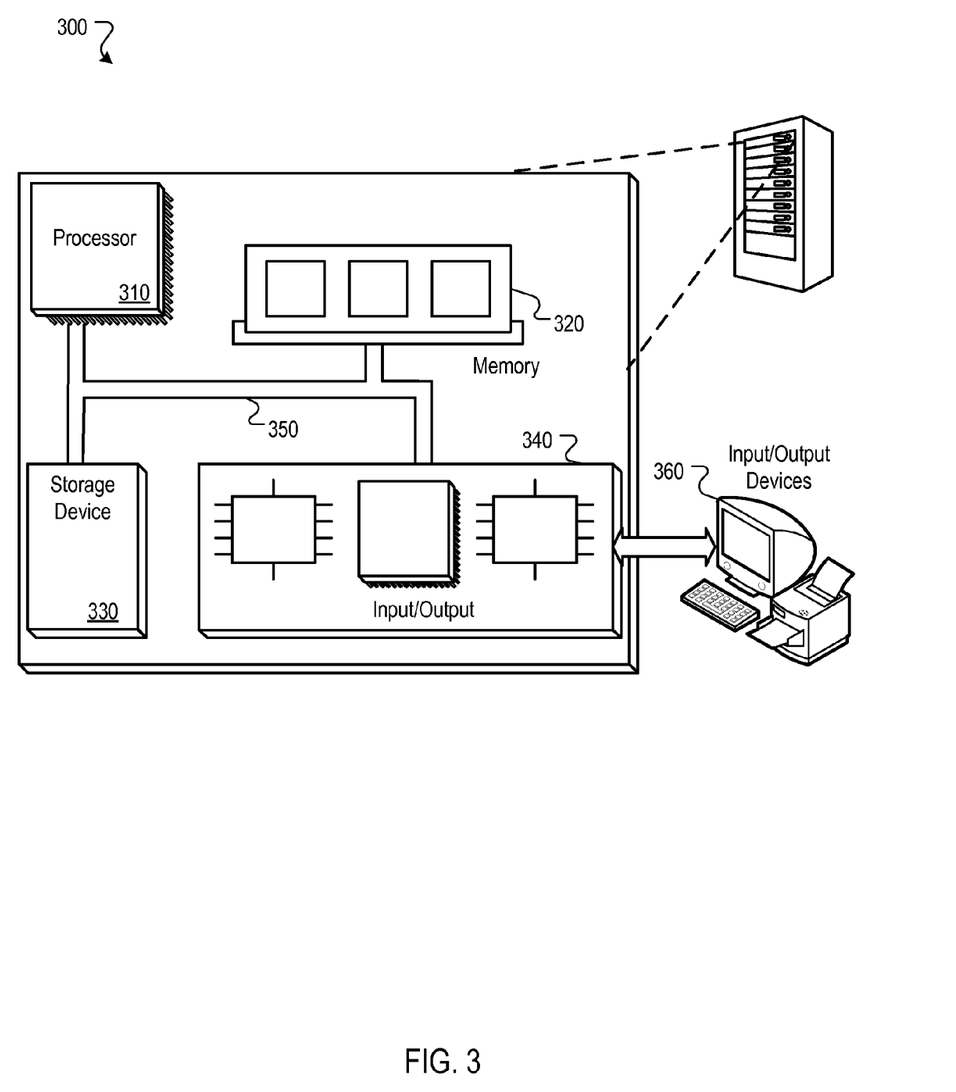
FIG. 3 is a block diagram of a programmable processing system.

An example of one such type of computer is shown in FIG. 4, which shows a block diagram of a programmable processing system (system). The system 400 that can be utilized to implement the systems and methods described herein. The architecture of the system 400 can, for example, be used to implement a computer client, a computer server, or some other computer device.

The system 400 includes a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 300. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 460.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, based on user interaction with a first content item that is presented with a resource page, a request for presentation of a given landing page to which the first content item links;
   providing, in response to the request and by one or more processors, data that causes presentation of both the given landing page of the first content item and one or more controls in a different interface than the resource page;
   determining a dwell time for the given landing page exceeds a dwell time threshold;
   identifying, in response to the dwell time for the given landing page exceeding the dwell time threshold, a second content item based on a subject matter of the first content item, the second content item linking to a different landing page than the first content item, the different landing page in a different domain than the given landing page;
   detecting user interaction with the one or more controls while the given landing page of the first content item is presented in the different interface;
   providing, in response to detecting the user interaction and by one or more processors, data that causes the different landing page of the second content item to directly replace the given landing page of the first content item in the different interface without the user returning to the resource page.

2. The method of claim 1, wherein the first content item is an advertisement.

3. The method of claim 1, wherein the resource page includes search results and the content item is one of the search results.

4. The method of claim 1, wherein the second content item is selected from an auction associated with an original decision to present the content item on the resource page.

5. The method of claim 1, further comprising identifying the second content item based at least in part on one or more characteristics associated with the second content item.

6. The method of claim 1, wherein the one or more controls enable navigation to other content items directly without having to navigate back to the resource page.

7. The method of claim 1, further comprising:
   pre-loading landing pages for content items in response to receiving the request; receiving instructions via the one or more controls to navigate to one of the pre-loaded landing pages; and
   providing immediate access to the one of the pre-loaded landing pages.

8. The method of claim 7, further comprising:
charging a content sponsor for the impression when the dwell time for the given landing page exceeds the dwell time threshold.

9. The method of claim 1, comprising:
pre-loading the different landing page for the second content item in response to user interaction with the first content item.

10. A method comprising:
detecting user interaction with a content item that is presented with a resource;
identifying a plurality of content items that are related to the content item, but link to different landing pages than the content item, wherein the different landing pages are in different domains than a given landing page that is linked to by the content item;
pre-loading one or more of the different landing pages of the plurality of content items; and
providing, in response to detecting the user interaction, data that causes presentation of an interface in which the given landing page for the content item is presented without the pre-loaded one or more of the pre-loaded different landing pages, the provided data including instructions that cause presentation of one or more controls that enable a user to navigate among the one or more of the pre-loaded different landing pages of the plurality of content items independent of navigation back to the resource, wherein the navigation among the one or more of the different landing pages of the plurality of content items comprises direct replacement of the given landing page with one of the one or more pre-loaded different landing pages of the plurality of content items;
determining a dwell time for the one of the given landing page exceeds a dwell time threshold;
identifying, in response to the dwell time for the given landing page exceeding the dwell time threshold, an additional content item based on a subject matter of the given landing pages;
adding the additional content item to a subset including the plurality of content items; and
directly providing, in response to user interaction with the one or more controls, one of the one or more pre-loaded different landing pages of the plurality of content items or a landing page of the additional content item in the interface.

11. The method of claim 10, wherein the content item is an advertisement.

12. The method of claim 10, wherein the resource includes search results and the content item is one of the search results.

13. The method of claim 10, wherein the one or more controls enables navigation to each of the one or more of the different landing pages of the pre-loaded of the plurality of content items independent of navigation back to the resource.

14. A system comprising:
one or more data processors; and
instructions stored on a computer storage apparatus that when executed by the one or more data processors cause the one or more data processors to perform operations comprising:
receiving, based on user interaction with a first content item that is presented with a resource page, a request for presentation of a given landing page to which the first content item links;
providing, in response to the request, data that causes presentation of both the given landing page of the first content item and one or more controls in a different interface than the resource page;
determining a dwell time for the given landing page exceeds a dwell time threshold;
identifying, in response to the dwell time for the given landing page exceeding the dwell time threshold, a second content item based on a subject matter of the first content item, the second content item linking to a different landing page than the first content item, the different landing page in a different domain than the given landing page;
detecting user interaction with the one or more controls while the given landing page of the first content item is presented in the different interface;
providing, in response to detecting the user interaction, data that cause the different landing page of the second content item to directly replace the given landing page of the first content item in the different interface without the user returning to the resource page.

15. The system of claim 14, wherein the first content item is an advertisement.

16. The system of claim 14, wherein the resource page includes search results and the first content item is one of the search results.

17. The system of claim 14, wherein the instructions cause the one or more data processors to perform operations further comprising identifying the second content item based at least in part on one or more characteristics associated with the second content item.

18. The system of claim 14, wherein the instructions, when executed by the one or more data processors, cause the one or more data processors to further perform operations comprising:
pre-loading landing pages for content items in response to receiving the request;
receiving instructions via the one or more controls to navigate to one of the pre-loaded landing pages; and
providing immediate access to the one of the pre-loaded landing pages.

19. A non-transitory computer program product, encoded on one or more memory devices, including instructions that when executed by one or more data processing apparatuses cause the one or more data processing apparatuses to perform operations comprising:
receiving, based on user interaction with a first content item that is presented with a resource page, a request for presentation of a given landing page to which the first content item links;
providing, in response to the request, data that causes presentation of both the landing page of the first content item and one or more controls in a different interface than the resource page;
determining a dwell time for the given landing page exceeds a dwell time threshold;
identifying, in response to the dwell time for the given landing page exceeding the dwell time threshold, a second content item based on a subject matter of the first content item, the second content item linking to a different landing page than the first content item, the different landing page in a different domain than the given landing page;
detecting user interaction with the one or more controls while the given landing page of the first content item is presented in the different interface;

providing, in response to detecting the user interaction, data that cause the different landing page of the second content item to directly replace the given landing page of the first content item in the different interface without the user returning to the resource page.

20. The computer program product of claim 19, wherein the first content item is an advertisement.

21. The computer program product of claim 19, wherein the resource page includes search results and the first content item is one of the search results.

* * * * *